US010996708B2

(12) United States Patent
Leroy et al.

(10) Patent No.: US 10,996,708 B2
(45) Date of Patent: May 4, 2021

(54) METHOD TO COMPENSATE BY A SERVER A CLOCK DEVIATION OF A CARD

(71) Applicant: GEMALTO SA, Meudon (FR)

(72) Inventors: Pascal Leroy, Meudon (FR); Hervé Poirier, Meudon (FR); Stéphane Touvet, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 431 days.

(21) Appl. No.: 16/083,504

(22) PCT Filed: Feb. 28, 2017

(86) PCT No.: PCT/EP2017/054669
§ 371 (c)(1),
(2) Date: Sep. 8, 2018

(87) PCT Pub. No.: WO2017/153209
PCT Pub. Date: Sep. 14, 2017

(65) Prior Publication Data
US 2020/0301467 A1 Sep. 24, 2020

(30) Foreign Application Priority Data
Mar. 8, 2016 (EP) ..................................... 16305258

(51) Int. Cl.
*G06F 1/12* (2006.01)
*G06F 1/14* (2006.01)
(Continued)

(52) U.S. Cl.
CPC .................. *G06F 1/12* (2013.01); *G06F 1/14* (2013.01); *G06Q 20/341* (2013.01);
(Continued)

(58) Field of Classification Search
CPC ........... G06F 1/12; G06F 1/14; G06Q 20/341; G06Q 20/3563; G06Q 20/382; G06Q 20/385; G06Q 20/401
See application file for complete search history.

(56) References Cited

U.S. PATENT DOCUMENTS

2015/0371234 A1* 12/2015 Huang .................. G06Q 20/20
705/44
2016/0125417 A1 5/2016 Huang et al.
2016/0328716 A1* 11/2016 Touvet ............... G06Q 20/4018

FOREIGN PATENT DOCUMENTS

WO WO2015/101457 A1 7/2015
WO WO2015/126753 A1 8/2015

OTHER PUBLICATIONS

PCT/EP2017/054669, Mar. 28, 2017, European Patent Office, P.B. 5818 Patentlaan 2 NL-2280 HV Rijswijk.
(Continued)

Primary Examiner — Terrell S Johnson
(74) Attorney, Agent, or Firm — The Jansson Firm; Pehr B. Jansson (57) ABSTRACT

This invention relates to a method to compensate by a server a clock deviation of a card i by maintaining a time base Tbase (i) synchronized with card i, the method comprising the steps of: receiving at a time TS a dynamic card verification dCVV code value generated by card i; providing a set of at least two dCVV code corresponding to two successive dCVV time periods; if the dCVV code received from card i corresponds to one of the dCVV codes of the provided set but is different from the reference dCVV code, determine the minimum possible timing drift Min_td between the time base maintained by the server for the card and the time base Tbase(i) of the card; updating time base Tbase(i) by addition of a time drift correction equal to the minimum possible time drift Min_td.

24 Claims, 4 Drawing Sheets (51) Int. Cl.
*G06Q 20/40* (2012.01)
*G06Q 20/38* (2012.01)
*G06Q 20/34* (2012.01)

(52) U.S. Cl.
CPC ....... *G06Q 20/3563* (2013.01); *G06Q 20/382* (2013.01); *G06Q 20/385* (2013.01); *G06Q 20/4018* (2013.01)

(56) References Cited

OTHER PUBLICATIONS

PCT/EP20171054669, Mar. 28, 2017, European Patent Office, D-80298 Munich, Germany.

\* cited by examiner

METHOD TO COMPENSATE BY A SERVER A CLOCK DEVIATION OF A CARD

TECHNICAL FIELD

The present invention relates to a method, a server and a computer program product to compensate by a server a clock deviation of a card. The invention is applicable to the field of secure transactions, particularly by means of the generation of a security code. More precisely, the field of the invention applies to the area of bank cards with displays comprising modules to generate codes for securing transactions.

BACKGROUND OF THE INVENTION

Currently, solutions exist already for making bank cards that can secure transactions by means of simple identification of the card by its number, date of validity and holder by telephone or via the Internet.

A banking card is generally implemented as a smartcard. Smartcards are plastic cards having at least an embedded smartcard chip. A smartcard chip is an integrated microcontroller generally comprising a central processing unit, a random access memory, a ROM memory and an EEPROM memory. A dual interface smartcard is a smartcard provided with a contact and a contactless communication interfaces. The integrated microcontroller is connected to both communication interfaces to perform transactions. Such a smartcard can carry out a transaction through its contact interface when it is hosted in a smartcard reader. Such a smartcard can carry out a transaction through its contactless interface when a contactless reader is located in near-field area. Smartcards are widely used to store sensitive information such as cryptographic keys or software routines that implement valuable algorithms or know-how.

A simple means of securing a transaction is the three-digit security code, also called CSC (Card Security Code), CVV (Card Verification Value), CVC (Card Verification Code) or V-code. The authors of this application use the widespread acronym that is known to those skilled in the art, CVV.

One of the problems of this means of securing is that the code is displayed statically on one of the sides of the card. As a result, the code can be read easily by a third party and be used jointly with the other information collected on the card.

To improve the security of such transactions using bank cards, making the CVV dynamic is known. The dynamic CVV, also noted dCVV, is a code that varies over time, which is displayed on the card. The variable code is supplied by a generator of the synchronized pseudo-random type with a server that makes it possible to verify the authenticity of the code depending on the date and time of the transaction.

During a banking transaction using the dCVV mechanism, a banking server needs to calculate the current dCVV for the given card at the current time, thanks to secrets and algorithm, and checks the card dCVV, displayed on card and read by the cardholder, by comparison to the calculated value. If the dCVV calculated by the card and the one calculated by the banking server have the same value, the banking transaction can be proceeded. On the contrary, the banking transaction fails in case of incorrect dCVV comparison.

As the dCVV mechanism is based on time, a Real Time Clock (RTC) using a 32.768 KHz crystal embedded in the card. Despite all the precaution taken during the manufacturing of the card, the crystal frequency is not exactly adjusted to 32.768 KHz and can vary due to external parameters such as temperature, ageing or load capacitance variation. So, a possible frequency deviation of a few ppm (parts per million) causes time deviation with the consequence of an advanced or delayed generation of the dCVV by the card compared to the one that is calculated by the banking server for verification purpose. Indeed, the server generally uses an accurate time base synchronized with the TAI (International Atomic Time).

In order to cope with this problem, several technologies belonging to the state of the art can be implemented in the card and/or in the server.

A time window can be defined and used during the verification process handled by the server. When a dCVV code is generated by the card and then received by the verification server, it is compared to all the dCVV codes generated by the verification server for the aforementioned time window. The drawback of this mechanism is that the system security is impacted. A dCVV code is generally represented using three digit allowing one thousand different code values. If the time window corresponds to five successive generated dCVV codes, a hacker transmitting a dCVV code chosen randomly will have one chance in two hundreds to find one allowing to proceed with the transaction. Therefore, this timing window should be as small as possible in order to reach an acceptable level of security.

A well-known mechanism can also be implemented by the card to mitigate at least partly the time drift due to the temperature variations. For that purpose, a sensor measuring periodically the temperature is implemented in the card. Based on the detected temperature variations, the card clock is then corrected. However, this mechanism is not sufficient to efficiently correct the whole timing drift as it is also due to other factors.

SUMMARY OF THE INVENTION

This invention relates to a method to compensate by a server a clock deviation of a card i by maintaining a time base Tbase(i) synchronized with card i, the method comprising the steps of:

receiving at a time TS a dynamic card verification dCVV code value generated by card i;

providing a set of at least two dCVV code corresponding to two successive dCVV time periods determined using the time base maintained by the server for the card and such that time TS falls within one of these time periods, a time period being defined as a duration and two time boundaries, the dCVV code associated to this period being called reference dCVV code;

if the dCVV code received from card i corresponds to one of the dCVV codes of the provided set but is different from the reference dCVV code, determine the minimum possible timing drift Min_td between the time base maintained by the server for the card and the time base Tbase(i) of the card, said minimum possible timing drift Min_td being deducted from the time difference between the closest time boundary of the period of time identified of the provided set corresponding to the dCVV received from the card and time TS;

updating time base Tbase(i) by addition of a time drift correction equal to the minimum possible time drift Min_td.

According to one embodiment, the number of dCVV codes in the provided set corresponds to a tolerance window of a predefined number of successive dCVV codes to be included in said set.

According to one embodiment, the tolerance window comprises three successive dCVV codes centred on the reference dCVV code.

According to one embodiment, the number of dCVV codes in the provided set is derived from a tolerance window corresponding to a predefined time duration.

According to one embodiment, the method may also comprise a step for determining a deviation coefficient DC configured to adapt the update frequency $f_{card}(i)$ of the time base Tbase(i) maintained by the server for card i, the deviation coefficient DC being derived from the minimum possible time drift Min_td.

According to one embodiment, the deviation coefficient is determined using the following expression:

$$DC = 1 + \left\{ \frac{Min\_td}{TS - T0} \right\}$$

where T0 represents the initial date or time clock setting of the card, the clock frequency $f_{card}(i)$ applied to update time base Tbase(i) being updated using the following expression:

$f_{card}(i) = DC \times f_{TAI}$ where $f_{TAI}$ represents the clock frequency of the server which is taken as a reference.

According to one embodiment, the coefficient DC is determined using at least two successive time drift estimations Min_td performed by the server for this card and by applying a function on these at least two estimations to reduce bias of estimation.

According to one embodiment, the function to reduce the bias of estimation is chosen among: an average function, a linearization function based on the method of least squares, a sin(x)/x interpolation.

The invention also relates to a server configured to compensate a clock deviation of a card i by maintaining a time base Tbase(i) synchronized with card i, the server being adapted to implement the above method.

The invention also relates to a computer program for instructing a computer to perform the above method.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
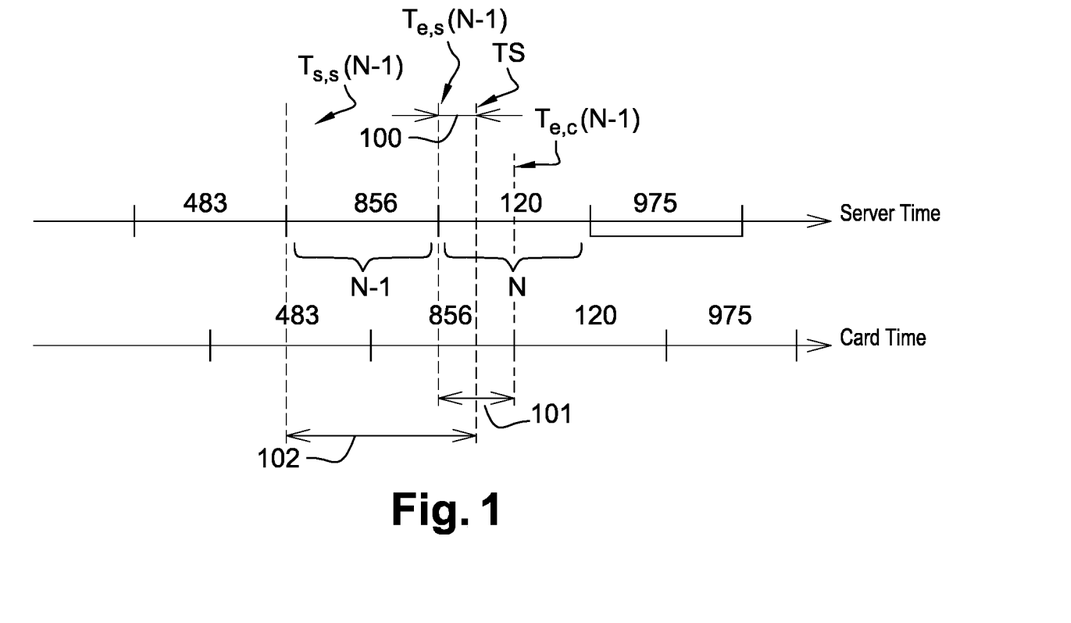
FIG. 1 provides an example where the time base of a card is delayed compared to the time base of the verification server.

FIG. 1 provides an example where the time base of a card is delayed compared to the time base of the verification server.

During a transaction, the verification server receives the card dCVV at the current time/date which is referred in this description as the timestamp and is noted TS. The verification server then computes the dCVV value which should normally be received at time TS in case of a correct time synchronization between the card and the server.

In the example of FIG. 1, the dCVV value calculated at time TS is equal to '120' which is the value corresponding to the current dCVV period of time noted N when considering the reference time base used by the server for the card. A period of time is characterized by a duration and two timing boundaries. The first timing boundary is the one defining the start of the period of time and the second boundary is the one defining the ending of the period of time. A dCVV period is a period of time which is associated to a given dCVV code value. The time base which is used for that purpose can be the reference time base of the server which is for example synchronized to the TAI time or a corrected time base which can be derived from the reference time base by the card.

A time base can be defined as an increment from a reference time. For example, for a reference time noted T0, the time base can be generated by incrementing a counter initialized on T0 at a given clock frequency $f_{clock}$. Several embodiments of a method adapted to compensate by a verification server the clock drift of a card are described hereafter. For that purpose, the verification server is adapted to maintain a time base synchronized with the card. This local time base can be maintained for example by adding a time correction to it, for example by adding of subtracting a number of increments, and alternatively or as a complement, to correct the $f_{clock}$ value.

The dCVV period preceding dCVV period N is referred as the dCVV period N−1.

In this example, the dCVV code value which is received by the verification server from the card at time TS is equal to '856'. Therefore, a comparison of the dCVV code value determined by the verification server with the one received from the card at time TS will lead to a failure of the transaction process.

In the description below, the following notation are further used:

$T_{s,s}(N-1)$ refers to the first timing boundary of dCVV period N−1 which is determined by the verification server using a time base maintained by the server for the card;

$T_{e,s}(N-1)$ refers to the second timing boundary of dCVV period N−1 which is determined by the verification server using a time base maintained by the server for the card;

$T_{s,c}(N-1)$ refers to the first timing boundary of dCVV period N−1 as handled by the card using its own time base;

$T_{e,c}(N-1)$ refers to the second timing boundary of dCVV period N−1 as handled by the card using its own time base;

Min_td refers to the minimum time drift possible between the time base of the verification server and the time base of the card;

Max_td refers to the maximum time drift possible between the time base of the verification server and the time base of the card.

When the card time is delayed compared to the one of the verification server, an offset called real time drift RTD can be defined. On FIG. 1, the real time drift 101 corresponds to the time difference between the second time boundary $T_{e,s}$ of period N−1 as handled by the verification server and the second time boundary of the same dCVV period noted $T_{e,c}$ but as handled at the card side. Therefore, RTD can be expressed as follow:

$$RTD = T_{e,s}(N-1) - T_{e,c}(N-1)$$

In this example, RTD is negative. When the time drift is negative, the minimum negative time drift value 100 and the maximum time drift value 102 can be expressed as a function of TS, $T_{e,s}(N-1)$ and $T_{s,s}(N-1)$. Therefore, one have:

$$Min\_td = T_{e,s}(N-1) - TS$$

$$Max\_td = T_{s,s}(N-1) - TS$$

Figure 2:
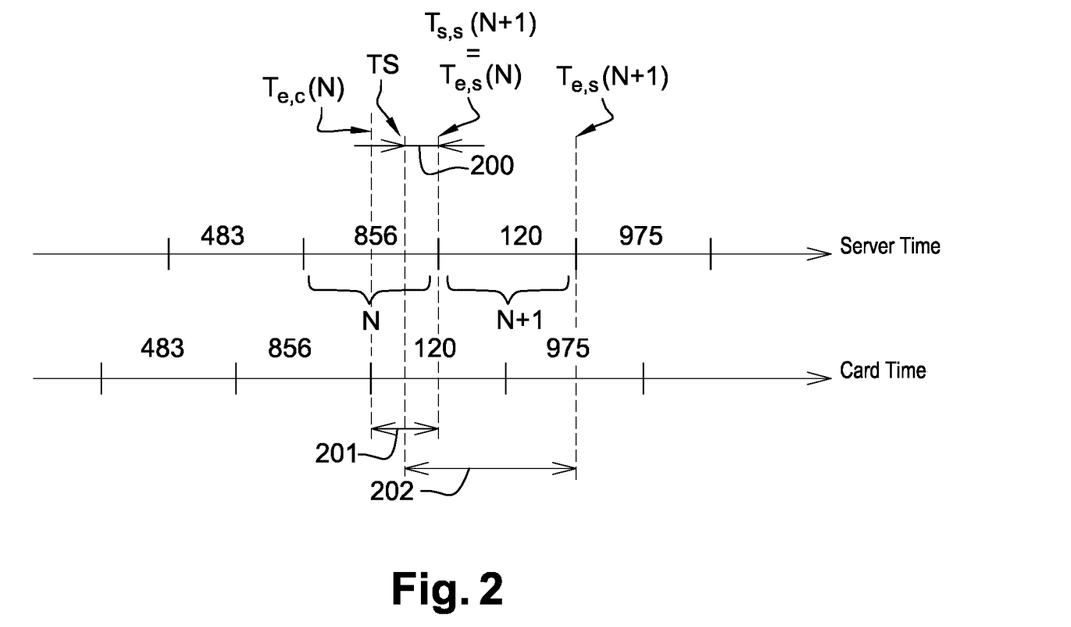
FIG. 2 provides an example where the time base of the card is in advance compared to time base of the verification server.

FIG. 2 provides an example where the time base of the card is in advance compared to time base of the verification server.

In this example, the dCVV code value calculated at time TS is equal to '856' whereas the one received by the verification server from the card at time TS is equal to '120'. As the dCVV period deducted from the verification server's time base maintained for the card is period N, the dCVV code value received from the card correspond to dCVV period N+1.

The real time drift 201 can be expressed as follow:

$$RTD = T_{e,s}(N) - T_{e,c}(N)$$

In the example of FIG. 2, the RTD value is positive. When the timing drift is positive, the minimum negative time drift value 200 and the maximum time drift value 202 can be expressed as a function of TS, $T_{e,s}(N+1)$ and $T_{s,s}(N+1)$. Therefore, one have:

$$Min\_td = T_{s,s}(N+1) - TS$$

$$Max\_td = T_{e,s}(N+1) - TS$$

In order to implement a mechanism to correct the time drift introduced by the clock deviation of the card, the verification server has a limited amount of information at its disposal. It is however possible to identify the dCVV period corresponding to the dCVV code value received from the card. In the example of FIG. 1, the verification server receives at time TS the dCVV code '856' from the card and is able to associate it to the dCVV period N−1 by comparing the received value to the one it has calculated using the time base maintained by the server for the card.

In the example of FIG. 2, the verification server receives at time TS the dCVV code value '120' from the card and is able to associate it to dCVV period N+1 by comparing the received value to the one it has calculated using its reference time base.

The verification server is not able to estimate the real time drift 101, 201 between the card and the verification server, however, it is able to estimate its minimum 100, 200 and maximum 102, 202 possible values noted respectively Min_td and Max_td. Indeed, and as underlined thanks to the example of FIGS. 1 and 2, these two values requires to know the dCVV period associated to the received dCVV code value and the first and second time boundaries of these periods on the verification server side.

According to one aspect of the invention, the mechanism to compensate the time drift between the card and the server is based on the use of the minimum time drift value for the verification server to maintain an artificial time base which is aligned as closely as possible with the card clock. The verification server is not able to calculate the real time drift as the first and second time boundaries of the dCVV periods handled by the card are unknown by the verification server.

Advantageously, using the minimum timing drift Min_td for maintaining by the verification server a time base associated to a given card allows to implement a correction without adding any additional timing error.

Figure 3:
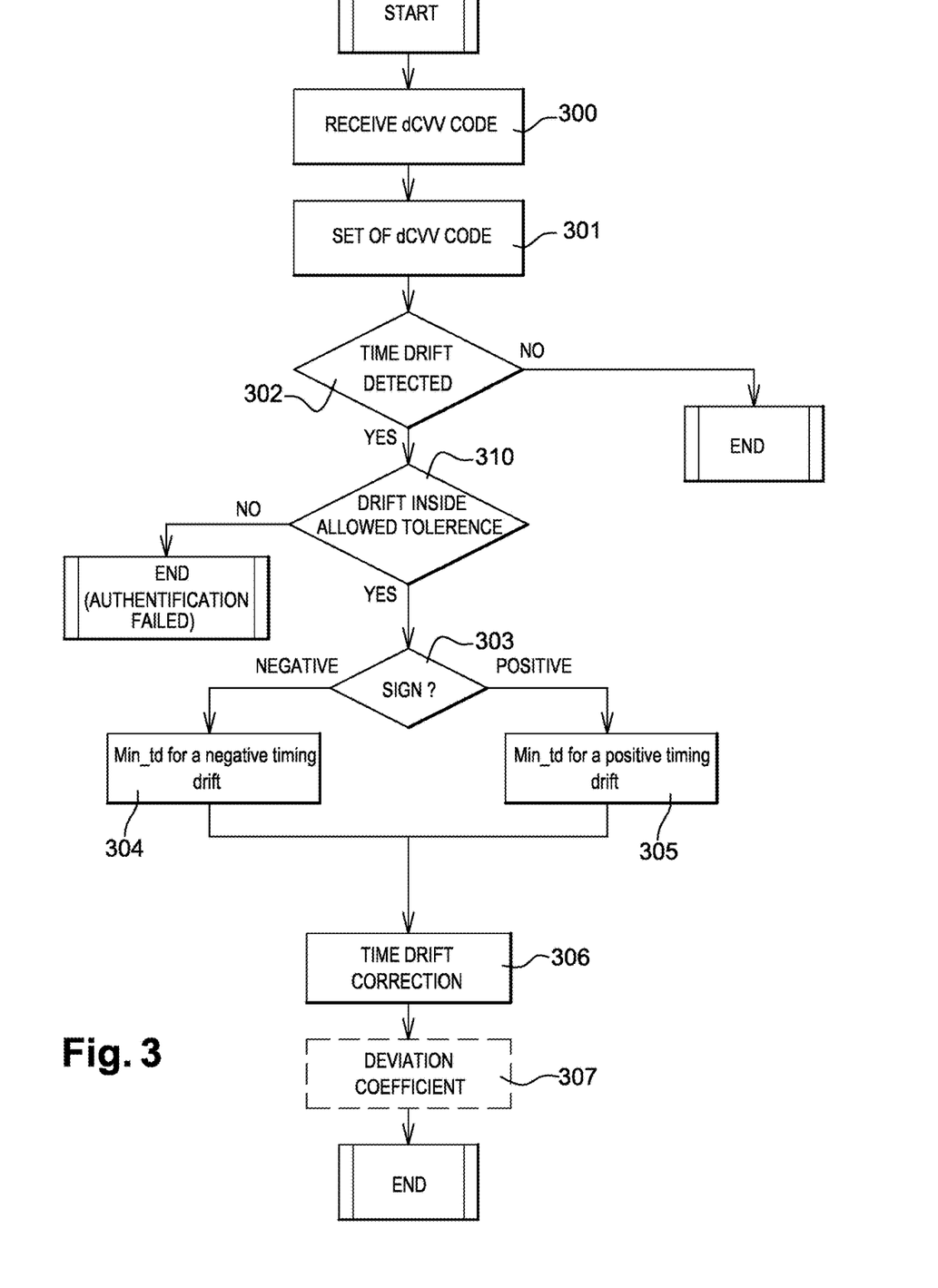
FIG. 3 is a diagram illustrating a way to implement the method for correcting the timing drift induced by the deviation of the card time base.

FIG. 3 is a diagram illustrating a way to implement the method for correcting the timing drift induced by the deviation of the card time base.

After receiving the dCVV code from the card 300 at a time TS, the verification server will get 301 a set of at least two dCVV codes corresponding to two successive dCVV time periods. This set corresponds to a tolerance window implemented for example using a time window or a predefined number of successive dCVV codes. To get this set of dCVV codes, the verification server may calculate these dCVV codes using the time base maintained by the server for the card (with or without a correction applied) or load them in case they are pre-calculated. The time boundaries associated to the dCVV periods are also determined.

Thanks to the use of the dCVV code received from the card and the provided set of dCVV codes calculated by the verification server, it is then possible to verify 302 if there is a detectable time drift between the card and the verification server. For that purpose, the dCVV period corresponding to the dCVV code value received from the card and its associated boundaries can be identified among those determined at step 301. In this example, it is assumed that the time drift introduced by the clock of the card will not exceed an allowed tolerance of one dCVV period. Therefore, in this example a tolerance window of plus or minus one dCVV code is defined at the verification server side. In other words, if the current period using the time base maintained for this card by the server at time TS is period N, a dCVV code received from the card and corresponding to a period lower than N−1 or greater than N+1 is considered as a wrong code resulting in an authentication failure. For a correct authentication, the period corresponding to the received dCVV code should be either period N−1, period N or period N+1. Therefore, in this example, it can be checked 310 if the received dCVV is inside the allowed tolerance or not. If not, the authentication fails, if yes the subsequent steps as described below can be applied.

In case the period of the dCVV code received from the card corresponds to period N−1 or N+1, a timing drift is detected by the verification server. In a case similar to the one of FIG. 1, period N−1 is detected and for FIG. 2, period N+1 is detected.

However, a time drift cannot be detected by the verification server when the dCVV code received from the card is identical the one associated to period N. For example, if the dCVV code calculated by the verification server is '120' and that the one received from the card at this time is also equal to '120', it will not be possible for the server to correct update the time base maintained by the verification server for this card.

If 302 there is no detected timing drift, the correction process stops. On the contrary, if a timing drift is detected and depending on its sign 303, the two following situations may be encountered.

Then, the minimum possible timing drift Min_td between the time base maintained by the server for the card and the time base of the card is determined. Min_td, is deducted from the time difference between the closest time boundary associated to the period of time identified as corresponding to the dCVV received from the card and time TS.

If the timing drift is negative 304, Min_td can be expressed as follow:

$$\text{Min\_td} = T_{e,s}(N-1) - TS$$

If the timing drift is positive 305, Min_td is expressed as follow:

$$\text{Min\_td} = T_{s,s}(N+1) - TS$$

$T_{e,s}(N-1)$ and $T_{s,s}(N+1)$ are known by the verification server and can therefore be used for determining Min_td.

Once the minimum timing drift value is determined, it is used to apply 306 a timing drift correction to a time base Tbase(i) which is maintained by the verification server for card associated to indice i. More precisely, an adjusted time base is maintained by the verification server for each card, and when a dCVV code is received by the verification server for a given card, the time base maintained by the verification server for this card is adjusted by adding the aforementioned minimum timing drift value to the current time base. Thus, for a given card, one have the following timing drift correction:

$$T\text{base}(i) = T\text{base}(i) + \text{Min\_td}$$

The skilled person will appreciate that Tbase(i) and Min_td can both be expressed in various timing units, for example in milliseconds or in a number of clock periods.

The method may also include a step 307 applying a deviation coefficient DC in order to adapt a clock frequency which is maintained by the verification server for each card. It can be determined using for example the following expression:

$$DC = 1 + \left\{ \frac{\text{Min\_td}}{TS - T0} \right\}$$

where T0 represents the initial date or time clock setting of the card, that is to say the initial timing at which the verification server and the card time were perfectly synchronized and therefore without time error. Therefore, the clock frequency $f_{card}(i)$ applied to the time base Tbase(i) maintained by the verification server for card i can be updated as follow:

$$f_{card}(i) = DC \times f_{TAI}$$

$f_{TAI}$ represents the clock frequency of the verification server which is taken as a reference and which is for example synchronized with the TAI (International Atomic Time).

If a verification server handles the dCVV verification process for a plurality of cards, the skilled person will appreciate that an adjusted time base has to be maintained for each of them as their clock will derive independently. In other word, each of the card will have its own timing drift error that should be compensated independently by the verification server.

The coefficient DC can also be refined using at least two or more successive time drift estimations and by applying on these estimations a more sophisticated calculation such as an average function or a linearization function based on the method of least squares. Other nonlinear forms of interpolation such as sin(x)/x interpolation can also be used in order to take into account no linear deviation such as the one due to the ageing of crystal.

Figure 4A:
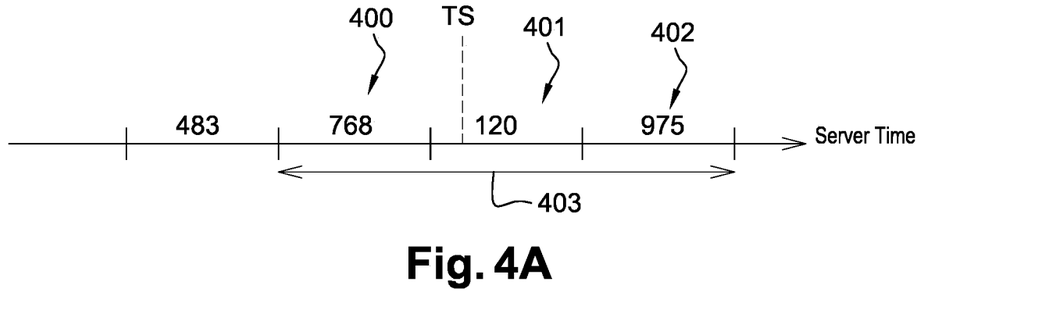
FIGS. 4A and 4B illustrate two examples in which a tolerance window is used as a basis for a preliminary verification by the verification server and in order to assess if the received dCVV code is allowed.
Figure 4B:
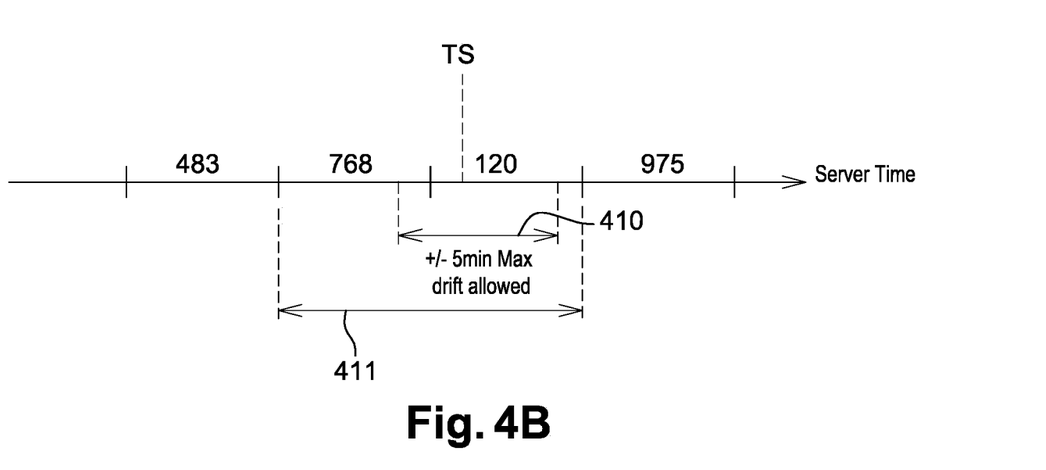

FIGS. 4A and 4B illustrate two examples in which a tolerance window is used as a basis for a preliminary verification by the verification server and in order to assess if the received dCVV code is allowed.

According to one embodiment of the invention, before applying corrections to the local time base maintained for a given card, the verification server may check if the received dCVV is considered as correct. For that purpose, for a dCVV code received from a given card at time TS.

The tolerance window can be expressed as a range of subsequent dCVV code values. In the example provided by FIG. 4A, a dCVV code received at time TS is accepted if it corresponds either to the current dCVV code 401 calculated by the verification server, the previous one 400 or the next one 402. Therefore, dCVV code '483' would be considered as wrong. In other words, the tolerance window 403 corresponds to a range of three dCVV codes 400, 401, 402 calculated by the verification server and centred on the one which is determined for time TS.

In another embodiment illustrated by the example of FIG. 4B, the tolerance window 410 is defined based on a maximum time drift, for example plus or minus five minutes around TS. In this example, if the dCVV codes '120' and '768' are received, those are allowed by the verification server.

In another embodiment, the timing window could be variable over time as drift rises over time. In another embodiment, the size of the timing window can also be reduced after a resynchronization performed by the verification server for the card.

Figure 5:
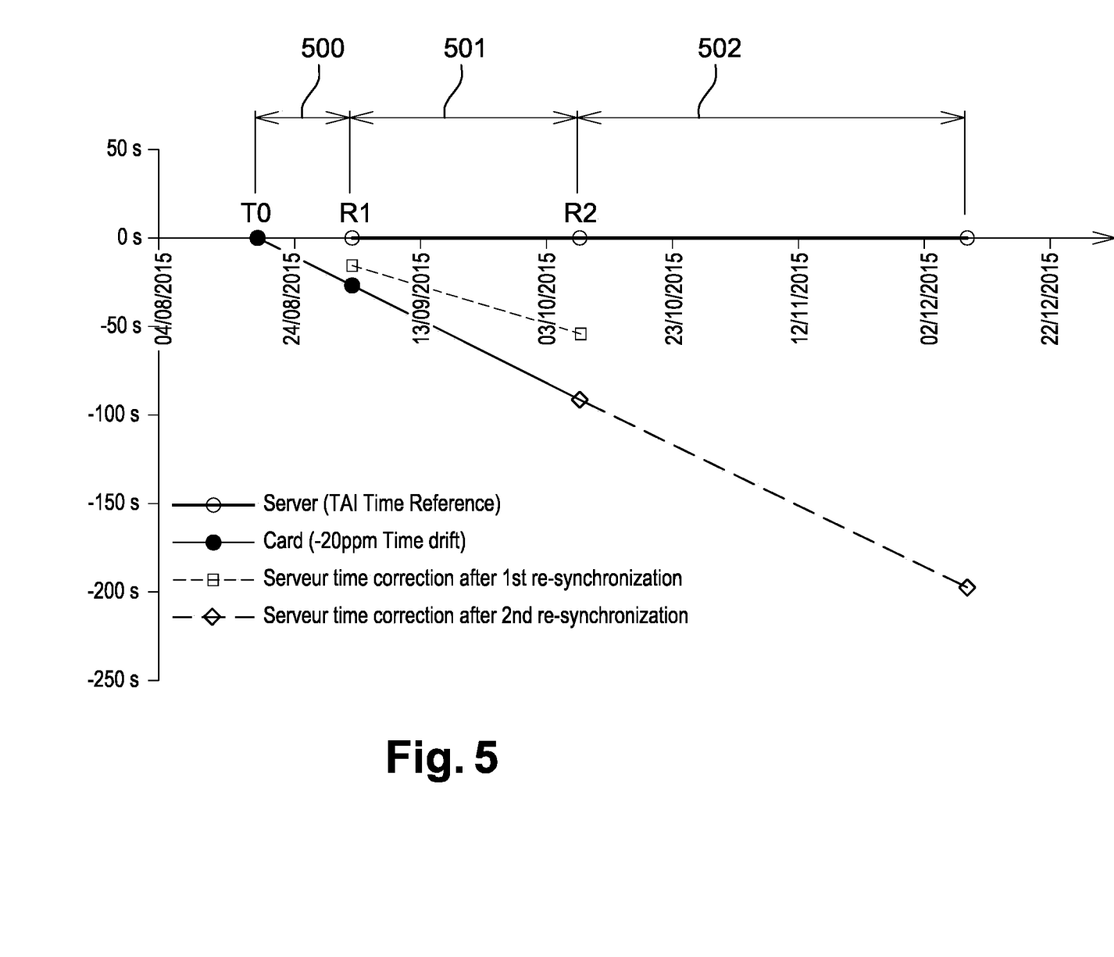
FIG. 5 provides an example of a time base synchronization performed by a verification server for a given card. The verification server reference time base is synchronized with the TAI time reference and is represented as aligned with the horizontal axis of the figure.

FIG. 5 provides an example of a time base synchronization performed by a verification server for a given card. The verification server reference time base is synchronized with the TAI time reference and is represented as aligned with the horizontal axis of the figure.

Time T0 corresponds to the initial date at which the card is perfectly synchronized with the server time. The initial synchronization can be performed for example during the manufacturing process of the card.

Then, the card time derives relatively to the server time.

In FIG. 5, the dashed lines correspond to the time base maintained by the verification server for a given card.

During a first period of time 500 and as no correction is applied yet to the time base maintained for the aforementioned card, it remains equal to the reference time base of the verification server. It is followed by two other subsequent period of time 501, 502. Two resynchronisation events are applied by the verification server in order to maintain the time base synchronized with this card. At time R1, a first time drift correction and a first deviation coefficient are applied to the time base maintained for this card followed by a second correction at time R2 at which a second time drift correction and a second deviation coefficient are applied to the time base. It appears from this example that the proposed method allows synchronising accurately the time base maintained for a given card to the time base generated locally by the card.

The invention claimed is:

1. A method to compensate by a server a clock deviation of a card i by maintaining a time base Tbase(i) synchronized with card i, the method comprising the steps of:

receiving at a time TS a dynamic card verification dCVV code value generated by card i;

providing a set of at least two dCVV code corresponding to two successive dCVV time periods determined using the time base maintained by the server for the card and such that time TS falls within one of these time periods, a time period being defined as a duration and two time boundaries, the dCVV code associated to this period being called reference dCVV code;

if the dCVV code received from card i corresponds to one of the dCVV codes of the provided set but is different from the reference dCVV code, determine the minimum possible timing drift Min_td between the time base maintained by the server for the card and the time base Tbase(i) of the card, said minimum possible timing drift Min_td being deducted from the time difference between the closest time boundary of the period of time identified of the provided set corresponding to the dCVV received from the card and time TS;

updating time base Tbase(i) by addition of a time drift correction equal to the minimum possible time drift Min_td.

2. The method according to claim 1, wherein the number of dCVV codes in the provided set corresponds to a tolerance window of a predefined number of successive dCVV codes to be included in said set.

3. The method according to claim 2, wherein the tolerance window comprises three successive dCVV codes centred on the reference dCVV code.

4. The method according to claim 1, wherein the number of dCVV codes in the provided set is derived from a tolerance window corresponding to a predefined time duration.

5. The method according to claim 1 comprising a step for determining a deviation coefficient DC configured to adapt the update frequency/$f_{card}(i)$ of the time base Tbase(i) maintained by the server for card i, the deviation coefficient DC being derived from the minimum possible time drift Min_td.

6. The method according to claim 5, wherein the deviation coefficient is determined using the following expression:

$$DC = 1 + \left\{ \frac{Min\_td}{TS - T0} \right\}$$

where T0 represents the initial date or time clock setting of the card, the clock frequency/$f_{card}(i)$ applied to update time base Tbase(i) being updated using the following expression:

$$f_{card}(i) = DC \times f_{TAI}$$

where $f_{TAI}$ represents the clock frequency of the server which is taken as a reference.

7. The method according to claim 5, wherein the deviation coefficient DC is determined using at least two successive time drift estimations Min_td performed by the server for this card and by applying a function on these at least two estimations to reduce bias of estimation.

8. The method according to claim 7, wherein the function to reduce the bias of estimation is chosen among: an average function, a linearization function based on the method of least squares, a sin(x)/x interpolation.

9. A server configured to compensate a clock deviation of a card i by maintaining a time base Tbase(i) synchronized with card i, the server adapted to implement a method comprising:

receiving at a time TS a dynamic card verification dCVV code value generated by card i;

providing a set of at least two dCVV code corresponding to two successive dCVV time periods determined using the time base maintained by the server for the card and such that time TS falls within one of these time periods, a time period being defined as a duration and two time boundaries, the dCVV code associated to this period being called reference dCVV code;

if the dCVV code received from card i corresponds to one of the dCVV codes of the provided set but is different from the reference dCVV code, determine the minimum possible timing drift Min_td between the time base maintained by the server for the card and the time base Tbase(i) of the card, said minimum possible timing drift Min_td being deducted from the time difference between the closest time boundary of the period of time identified of the provided set corresponding to the dCVV received from the card and time TS;

updating time base Tbase(i) by addition of a time drift correction equal to the minimum possible time drift Min_td.

10. The server according to claim 9, wherein the number of dCVV codes in the provided set corresponds to a tolerance window of a predefined number of successive dCVV codes to be included in said set.

11. The server according to claim 10, wherein the tolerance window comprises three successive dCVV codes centred on the reference dCVV code.

12. The server according to claim 9, wherein the number of dCVV codes in the provided set is derived from a tolerance window corresponding to a predefined time duration.

13. The server according to claim 9, comprising a step for determining a deviation coefficient DC configured to adapt the update frequency/$f_{card}(i)$ of the time base Tbase(i) maintained by the server for card i, the deviation coefficient DC being derived from the minimum possible time drift Min_td.

14. The server according to claim 13, wherein the deviation coefficient is determined using the following expression:

$$DC = 1 + \left\{ \frac{Min\_td}{TS - T0} \right\}$$

where T0 represents the initial date or time clock setting of the card, the clock frequency/$f_{card}(i)$ applied to update time base Tbase(i) being updated using the following expression:

$$f_{card}(i) = DC \times f_{TAI}$$

where $f_{TAI}$ represents the clock frequency of the server which is taken as a reference.

15. The server according to claim 13, wherein the deviation coefficient DC is determined using at least two successive time drift estimations Min_td performed by the server for this card and by applying a function on these at least two estimations to reduce bias of estimation.

16. The server according to claim 15, wherein the function to reduce the bias of estimation is chosen among: an average function, a linearization function based on the method of least squares, a sin(x)/x interpolation.

17. A non-transitory machine-readable storage medium server having stored thereon a computer program for compensating by a server a clock deviation of a card i by maintaining a time base Tbase(i) synchronized with card i, comprising instructions to cause the server to perform the steps:

receiving at a time TS a dynamic card verification dCVV code value generated by card i;

providing a set of at least two dCVV code corresponding to two successive dCVV time periods determined using the time base maintained by the server for the card and such that time TS falls within one of these time periods, a time period being defined as a duration and two time boundaries, the dCVV code associated to this period being called reference dCVV code;

if the dCVV code received from card i corresponds to one of the dCVV codes of the provided set but is different from the reference dCVV code, determine the minimum possible timing drift Min_td between the time base maintained by the server for the card and the time base Tbase(i) of the card, said minimum possible timing drift Min_td being deducted from the time difference between the closest time boundary of the period of time identified of the provided set corresponding to the dCVV received from the card and time TS;

updating time base Tbase(i) by addition of a time drift correction equal to the minimum possible time drift Min_td.

18. The non-transitory machine-readable storage medium server having stored thereon a computer program according to claim 17, wherein the number of dCVV codes in the provided set corresponds to a tolerance window of a predefined number of successive dCVV codes to be included in said set.

19. The non-transitory machine-readable storage medium server having stored thereon a computer program according to claim 18, wherein the tolerance window comprises three successive dCVV codes centred on the reference dCVV code.

20. The non-transitory machine-readable storage medium server having stored thereon a computer program according to claim 17, wherein the number of dCVV codes in the provided set is derived from a tolerance window corresponding to a predefined time duration.

21. The non-transitory machine-readable storage medium server having stored thereon a computer program according to claim 17, comprising a step for determining a deviation coefficient DC configured to adapt the update frequency/$f_{card}(i)$ of the time base Tbase(i) maintained by the server for card i, the deviation coefficient DC being derived from the minimum possible time drift Min_td.

22. The non-transitory machine-readable storage medium server having stored thereon a computer program according to claim 21, wherein the deviation coefficient is determined using the following expression:

$$DC = 1 + \left\{ \frac{\text{Min\_td}}{TS - T0} \right\}$$

where T0 represents the initial date or time clock setting of the card, the clock frequency/$f_{card}(i)$ applied to update time base Tbase(i) being updated using the following expression:

$$f_{card}(i) = DC \times f_{TAI}$$

where $f_{TAI}$ represents the clock frequency of the server which is taken as a reference.

23. The non-transitory machine-readable storage medium server having stored thereon a computer program according to claim 21, wherein the deviation coefficient DC is determined using at least two successive time drift estimations Min_td performed by the server for this card and by applying a function on these at least two estimations to reduce bias of estimation.

24. The non-transitory machine-readable storage medium server having stored thereon a computer program according to claim 23, wherein the function to reduce the bias of estimation is chosen among: an average function, a linearization function based on the method of least squares, a sin(x)/x interpolation.

* * * * *